US012611787B1

(12) United States Patent

Lowe

(10) Patent No.: US 12,611,787 B1

(45) Date of Patent: Apr. 28, 2026

(54) SCISSORS

(71) Applicant: Randall B. Lowe, Mount Wolf, PA (US)

(72) Inventor: Randall B. Lowe, Mount Wolf, PA (US)

( * ) Notice: Subject to any disclaimer, the term of this patent is extended or adjusted under 35 U.S.C. 154(b) by 0 days.

(21) Appl. No.: 19/200,419

(22) Filed: May 6, 2025

(51) Int. Cl.
*B26B 13/20* (2006.01)

(52) U.S. Cl.
CPC .................................... *B26B 13/20* (2013.01)

(58) Field of Classification Search
CPC ......... B26B 13/00; B26B 13/12; B26B 13/14; B26B 13/20; B26B 13/24
USPC .................................................. D8/4, 51-58
See application file for complete search history.

(56) References Cited

U.S. PATENT DOCUMENTS

| | | | | | |
|---|---|---|---|---|---|
| 187,713 | A * | 2/1877 | Kelly | B26B 13/00 | 30/256 |
| 430,677 | A * | 6/1890 | Pearsall | B26B 13/20 | 30/341 |
| 440,436 | A * | 11/1890 | Pearsall | B26B 13/20 | 30/341 |
| 753,919 | A * | 3/1904 | Rowe | B26B 13/00 | 30/256 |
| 869,949 | A * | 11/1907 | Westerdahl | B26B 13/20 | 30/268 |
| 919,211 | A * | 4/1909 | Race | B26B 13/20 | 30/341 |
| 927,058 | A * | 7/1909 | Krouse | B26B 13/20 | 30/341 |
| 1,479,908 | A * | 1/1924 | Goshia | B26B 13/20 | 30/271 |
| 2,158,277 | A * | 5/1939 | Dolph | B26B 13/20 | 30/341 |
| 2,380,075 | A * | 7/1945 | Rose | B26B 13/20 | 30/341 |
| 2,571,675 | A * | 10/1951 | Bray | B26B 13/20 | 30/341 |
| 2,744,324 | A * | 5/1956 | Chuba | B26B 13/24 | 30/271 |

(Continued)

FOREIGN PATENT DOCUMENTS

| | | | | |
|---|---|---|---|---|
| DE | 2924830 | B1 * | 11/1980 | B26B 13/20 |
| DE | 3928859 | A1 * | 3/1991 | B26B 13/20 |

(Continued)

OTHER PUBLICATIONS

Les ateliers de Marinette Threaded Washer (www.ateliers-marinette.fr/en/lamp-accessories/threaded-washer-nickel-m10-electric.html) (Year: 2017).*

*Primary Examiner* — Jason Daniel Prone
(74) *Attorney, Agent, or Firm* — Grandview Law PLLC

(57) ABSTRACT

Systems involve a scissors assembly including (I) a thumb handle; and (II) a thumb ring having a first coupling condition, a second coupling condition, and a third coupling condition. When the thumb ring is in the first coupling condition, the thumb ring is fixedly coupled to the thumb handle. When the thumb ring is in the second coupling condition, the thumb ring is rotatably coupled to the thumb handle. When the thumb ring is in the third coupling condition, the thumb ring is slidably coupled to the thumb handle. Other aspects are described in the claims, drawings, and text forming a part of the present disclosure.

20 Claims, 12 Drawing Sheets

(56) References Cited

U.S. PATENT DOCUMENTS

| | | | | | |
|---|---|---|---|---|---|
| 3,978,584 | A * | 9/1976 | Mayer | B26B 13/20 | D8/57 |
| 4,146,961 | A * | 4/1979 | Pinto | B26B 13/20 | 30/271 |
| 4,642,895 | A * | 2/1987 | Gauvry | B26B 13/20 | 30/271 |
| 5,060,381 | A * | 10/1991 | Taberlet | B26B 13/12 | 30/232 |
| 5,109,608 | A * | 5/1992 | Pracht | B26B 13/20 | 30/232 |
| 5,722,171 | A * | 3/1998 | Schmidt | B26B 13/12 | 30/255 |
| 5,781,999 | A * | 7/1998 | Chang | B26B 13/20 | 30/232 |
| 6,212,780 | B1 * | 4/2001 | Huang | B26B 13/20 | 30/232 |
| 6,249,977 | B1 * | 6/2001 | Knoop | B26B 13/24 | 30/232 |
| 6,915,578 | B2 * | 7/2005 | Yusufov | B26B 13/00 | 30/232 |
| 7,260,894 | B2 * | 8/2007 | Zammitto | B26B 13/24 | 30/232 |
| 7,424,778 | B2 * | 9/2008 | Brenton | B26B 13/20 | 30/341 |
| 7,966,733 | B2 * | 6/2011 | Jun | B26B 13/20 | 30/232 |
| 8,176,638 | B2 * | 5/2012 | Hann | B26B 13/12 | 30/232 |
| 8,438,739 | B2 * | 5/2013 | Fujii | B26B 13/12 | 30/232 |
| 9,421,690 | B2 | 8/2016 | Soucie et al. | | |
| 9,724,835 | B2 * | 8/2017 | Soucie | B26B 13/20 | |
| 10,029,376 | B2 * | 7/2018 | Soucie | B26B 13/20 | |
| 10,478,979 | B1 * | 11/2019 | James | B26B 13/20 | |
| D932,266 | S * | 10/2021 | Lowe | D8/57 | |
| D934,046 | S * | 10/2021 | Lowe | D8/57 | |
| 2003/0106222 | A1 * | 6/2003 | Huang | B26B 13/20 | 30/232 |
| 2005/0005456 | A1 * | 1/2005 | Wang | B26B 13/12 | 30/232 |
| 2006/0010695 | A1 * | 1/2006 | Wu | B26B 13/20 | 30/232 |
| 2006/0064879 | A1 * | 3/2006 | Lauritzen | B26B 13/20 | 30/232 |
| 2010/0192384 | A1 * | 8/2010 | Fox | B26B 13/20 | 30/232 |
| 2010/0212165 | A1 * | 8/2010 | Parnazzini | B26B 13/12 | 30/232 |
| 2010/0242289 | A1 * | 9/2010 | Roskam | B26B 13/20 | 30/232 |
| 2012/0079724 | A1 * | 4/2012 | Huang | B26B 13/12 | 30/232 |
| 2015/0375406 | A1 * | 12/2015 | De Stefano | B26B 13/20 | 30/254 |
| 2017/0173803 | A1 * | 6/2017 | Gathing | B26B 13/20 | |
| 2018/0141222 | A1 * | 5/2018 | Takahashi | B26B 13/20 | |
| 2021/0402628 | A1 * | 12/2021 | Shuman | B26B 13/24 | |

FOREIGN PATENT DOCUMENTS

| | | | | |
|---|---|---|---|---|
| DE | 10328225 | A1 * | 1/2005 | B26B 13/20 |
| EP | 0244829 | A1 * | 11/1987 | B26B 13/20 |
| EP | 0714737 | A1 * | 6/1996 | B26B 13/20 |
| FR | 1187248 | A * | 9/1959 | B26B 13/20 |
| FR | 2636557 | A1 * | 3/1990 | B26B 13/14 |
| GB | 2014502 | A * | 8/1979 | B26B 13/20 |
| JP | S6368973 | U * | 5/1988 | B26B 13/20 |
| JP | H01178877 | U * | 12/1989 | B26B 13/20 |
| JP | H02116274 | U * | 9/1990 | B26B 13/00 |
| JP | 2013085761 | A * | 5/2013 | B26B 13/20 |
| KR | 101013386 | B1 * | 2/2011 | B26B 13/00 |
| KR | 20120019718 | A * | 3/2012 | B26B 13/20 |
| KR | 200465062 | Y1 * | 1/2013 | B26B 13/24 |
| KR | 20140024719 | A * | 3/2014 | B26B 13/20 |
| KR | 20150017479 | A * | 2/2015 | B26B 13/20 |
| KR | 101497645 | B1 * | 3/2015 | B26B 13/20 |
| WO | WO-9746353 | A1 * | 12/1997 | B26B 13/24 |

* cited by examiner

SCISSORS

SUMMARY

In one or more aspects a scissors assembly includes (I) a thumb handle; and (II) a thumb ring having a first coupling condition and a second coupling condition, wherein when the thumb ring is in the first coupling condition, the thumb ring is fixedly coupled to the thumb handle, and wherein when the thumb ring is in the second coupling condition, the thumb ring is rotatably coupled to the thumb handle.

In implementations the thumb ring includes a third coupling condition, and wherein when the thumb ring is in the third coupling condition, the thumb ring is slidably coupled to the thumb handle.

Implementations include including a first threaded nut, wherein the thumb handle includes a proximate side and a distal side, wherein the proximate side of the thumb handle is distanced closer to the thumb ring than the distal side is distanced to the thumb ring, and wherein when the thumb ring is fixedly coupled to the thumb handle, the first threaded nut is positioned to impart force against the proximate side of the thumb handle.

In implementations when the thumb ring is fixedly coupled to the thumb handle, the first threaded nut is positioned to contact the proximate side of the thumb handle to impart force against the proximate side of the thumb handle.

In implementations when the thumb ring is slidably coupled to the thumb handle, the first threaded nut is positioned to impart no force against the proximate side of the thumb handle.

In implementations the thumb ring includes a proximate side, and wherein when the thumb ring is fixedly coupled to the thumb handle, the second threaded nut is positioned to apply force against the proximate side of the thumb ring.

Implementations include at least one compressible washer, wherein the at least one compressible washer is positioned to contact the proximate side of the thumb ring.

In implementations when the thumb ring is fixedly coupled to the thumb handle, the second threaded nut is positioned to contact the at least one compressible washer to apply force through the at least one compressible washer against the proximate side of the thumb ring.

Implementations include a shaft member, wherein the shaft member includes a cylindrical portion, and wherein the shaft member is fixedly coupled with the thumb ring.

In implementations include a support member, wherein the support member includes a cylindrical aperture, and wherein the cylindrical portion of the shaft member extends at least partially through the cylindrical aperture of the support member.

In implementations the thumb handle includes a longitudinal aperture with first and second ends and with first and second sides, wherein the longitudinal aperture has a length dimension extending between the first and second ends, wherein the longitudinal aperture has a width dimension extending between the first and second sides, with the width dimension smaller than the length dimension, and wherein the support member extends at least partially through a portion of the longitudinal aperture of the thumb handle.

In implementations the support member has a first flat side portion and a second flat side portion, wherein at least a portion of the first flat side portion is positioned adjacent to the first side of the longitudinal aperture, and wherein at least a portion of the second flat side portion is positioned adjacent to the second side of the longitudinal aperture.

In implementations the support member has a first threaded side portion and a second threaded side portion, wherein a first portion of the first threaded side portion is threadedly coupled with the first threaded nut, wherein a second portion of the first threaded side portion is threadedly coupled with the second threaded nut, wherein a first portion of the second threaded side portion is threadedly coupled with the first threaded nut, and wherein a second portion of the second threaded side portion is threadedly coupled with the second threaded nut.

Implementations include a plurality of threaded nuts, wherein positioning of the plurality of threaded nuts between the thumb ring and the thumb handle determines one or more of the coupling conditions of the thumb ring.

In one or more aspects a scissors assembly includes (I) a thumb handle; (II) a thumb ring; and (III) one or more threaded nuts positioned between the thumb handle and the thumb ring, wherein positioning of the one or more threaded nuts between the thumb handle and the thumb ring determines whether the thumb ring is fixedly coupled or rotatably coupled to the thumb handle.

In implementations positioning of the one or more threaded nuts between the thumb handle and the thumb ring determines whether the thumb ring is slidably coupled to the thumb handle.

In implementations including a support member having a cylindrical aperture and a shaft member extending through the cylindrical aperture, wherein the shaft member is coupled to the thumb ring, wherein the support member includes at least one threaded side portion, and wherein the one or more threaded nuts are coupled with a portion of the at least one threaded side portion of the support member.

In one or more aspects a scissors assembly includes (I) a thumb handle; (II) a support member coupled with thumb handle; and (III) a thumb ring coupled with the support member; (IV) a first threaded nut coupled with the support member to be positioned between the thumb handle and the thumb ring; and (V) a second threaded nut coupled with the support member to be positioned between the thumb handle and the thumb ring, wherein the first threaded nut is spaced closer to the thumb handle than the second threaded nut is spaced from the thumb handle, wherein the second threaded nut is spaced closer to the thumb ring than the first threaded nut is spaced from the thumb ring, wherein when the thumb ring is slidably coupled with the thumb handle, the first threaded nut is positioned to impart no force on to the thumb handle, wherein when the thumb ring is fixedly coupled with the thumb handle, the second threaded nut is positioned to impart force on to the thumb ring, and wherein when the thumb ring is rotatably coupled with the thumb handle, the second threaded nut is positioned to impart no force on to the thumb ring.

In implementations when the thumb ring is fixedly coupled to the thumb handle, the first threaded nut is positioned to impart force against the thumb handle.

In implementations the thumb handle includes a longitudinal aperture with first and second ends and with first and second sides, wherein the longitudinal aperture has a length dimension extending between the first and second ends, wherein the longitudinal aperture has a width dimension extending between the first and second sides, with the width dimension smaller than the length dimension, and wherein the support member extends at least partially through the longitudinal aperture of the thumb handle.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Scissors Assembly with Enhanced Thumb Ring System, articles of manufacture, compositions of matter for same that may provide context, for instance, in introducing one or more processes and/or devices described herein.

DETAILED DESCRIPTION

Figure 1:
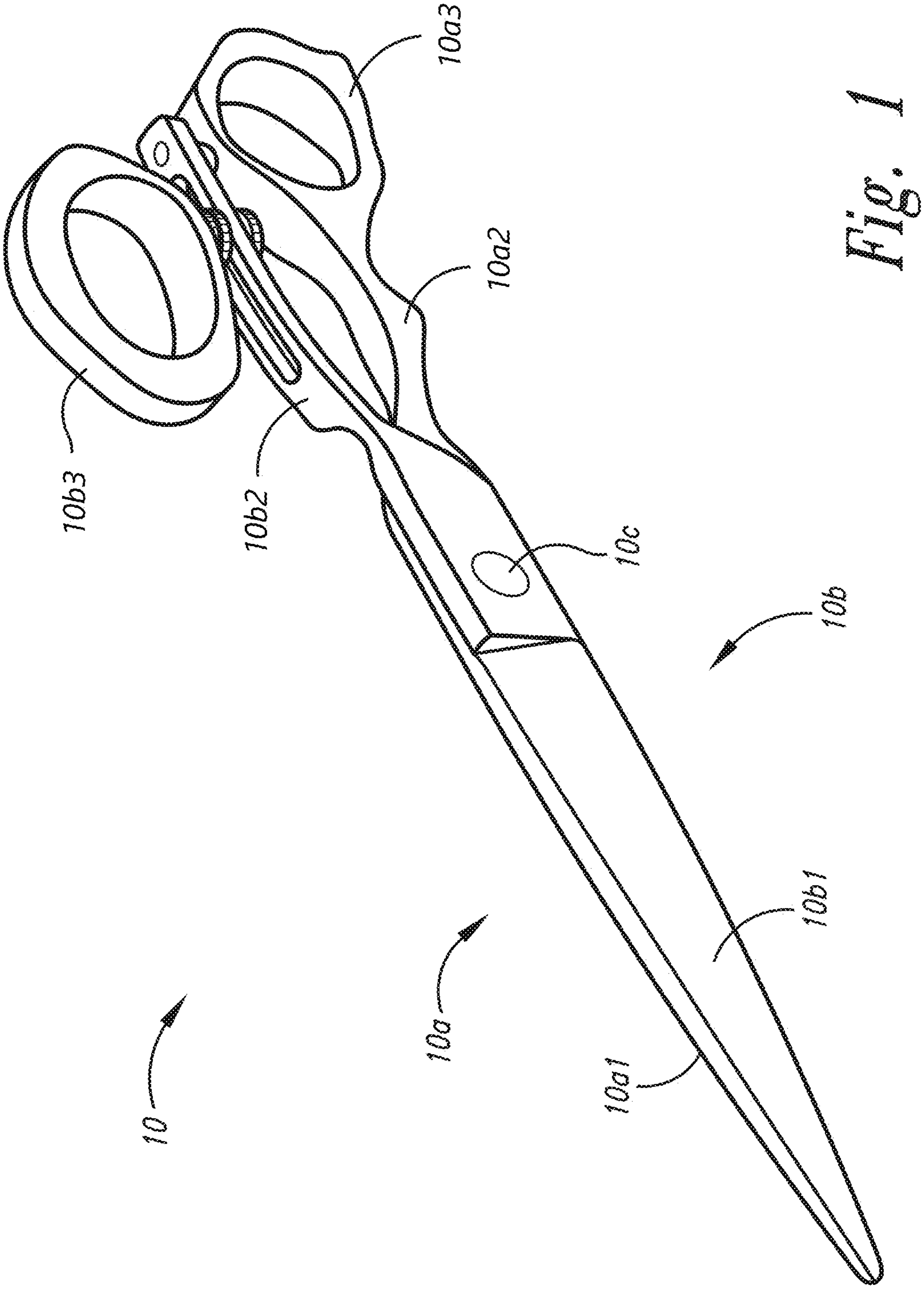
FIG. 1 is a top perspective view of a scissors assembly.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a top perspective view of scissors assembly 10. Implementations of scissors assembly 10 include scissor member **10*a*, scissor member 10*b*, and pivot 10*c*. Implementations of scissor member 10*a* include blade portion 10*a*1, finger handle 10*a*2, and finger ring 10*a*3. Implementations of scissor member 10*b* include blade portion 10*b*1, thumb handle 10*b*2, and thumb ring 10*b*3**.

Figure 2:
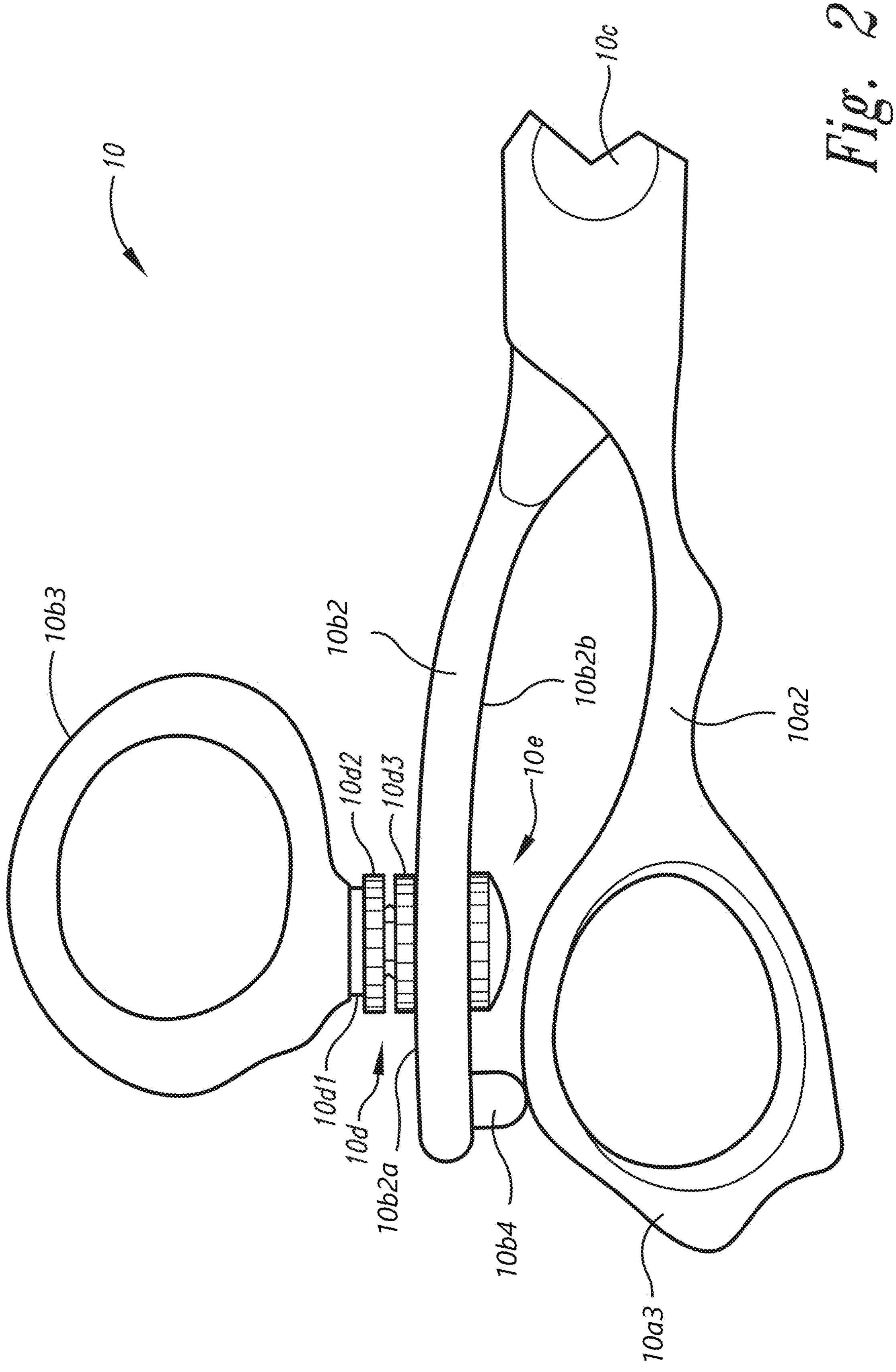
FIG. 2 is an side elevational view of a portion of the scissors assembly of FIG. 1.

Turning to FIG. 2, depicted therein is an side elevational view of a portion of scissors assembly 10 shown to include fastener collection **10*d*, support member 10*e*, and shaft member 10*f*. Implementations of scissor member 10*b* include bumper 10*b*4. Implementations of thumb handle 10*b*2 include proximate side 10*b*2*a* and distal side 10*b*2*b*. Implementations of fastener collection 10*d* include compressible washer 10*d*1, threaded nut 10*d*2, and threaded nut 10*d*3. In implementations compressible washer 10*d*1** can include materials such as rubber (nitrile/buna-n), ethylene propylene diene monomer (epdm) rubber, polychloroprene (neoprene), silicone rubber, fluoroelastomer (viton/fkm), natural rubber, leather, felt, fiber (cellulose/nylon blend), cork, cork-rubber composite, polytetrafluoroethylene (ptfe/teflon), polyvinyl chloride (pvc/vinyl), closed-cell foam, flexible graphite, non-asbestos composites, or polyurethane, etc.

Figure 3:
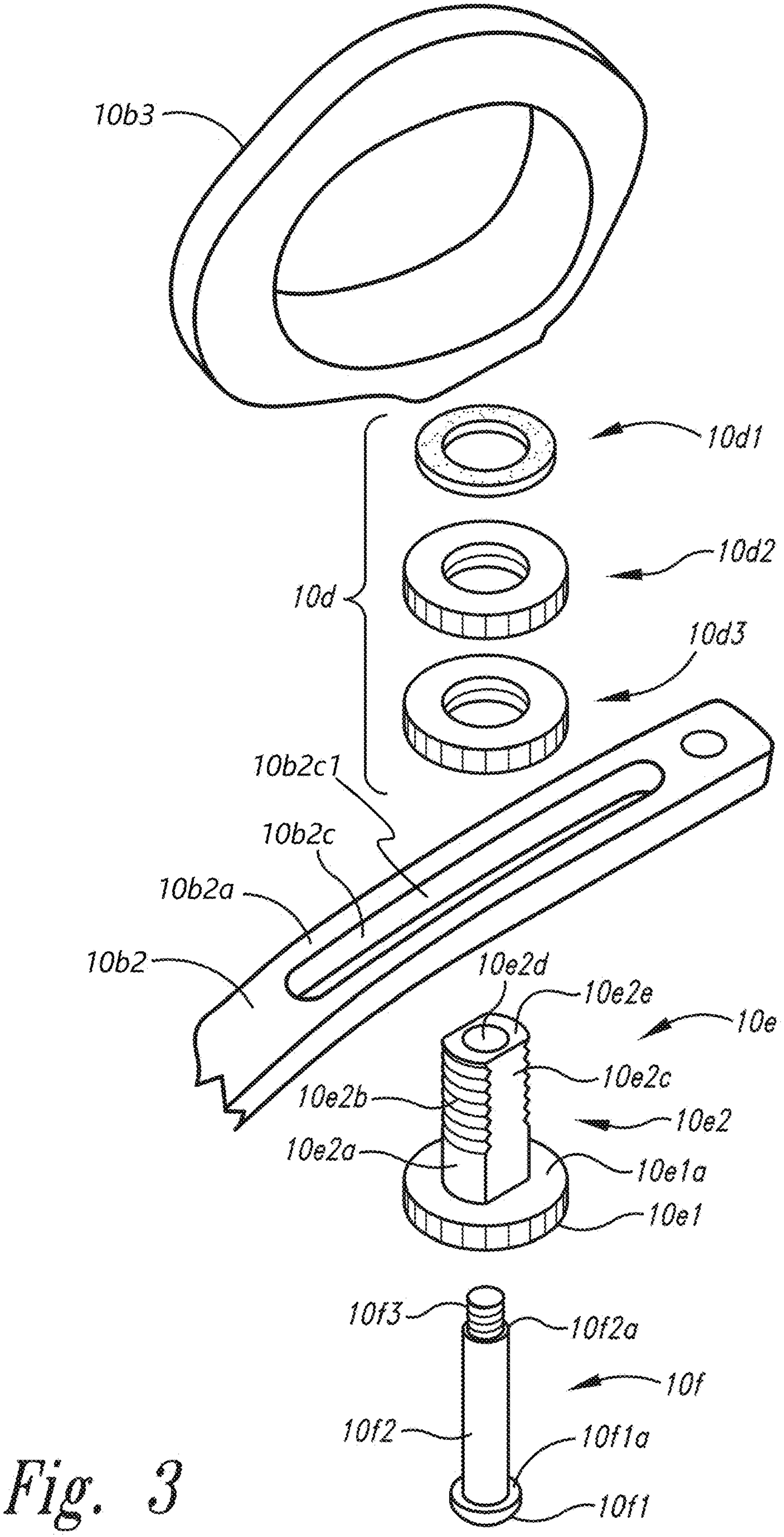
FIG. 3 is an enlarged exploded perspective view of a portion of the scissors assembly of FIG. 1.

Turning to FIG. 3, depicted therein is an enlarged exploded perspective view of a portion of scissors assembly 10. Implementations of thumb handle **10*b*2 include elongated aperture 10*b*2*c* with longitudinal side 10*b*2*c*1. Implementations of support member 10*e* include head portion 10*e*1 with proximate side 10*e*1*a*. Implementations of support member 10*e* include stem portion 10*e*2 with curvilinear side portion 10*e*2*a*, threaded side portion 10*e*2*b*, flat side 10*e*2*c*, cylindrical aperture 10*e*2*d*, and proximate side 10*e*2*e***.

Figure 4:
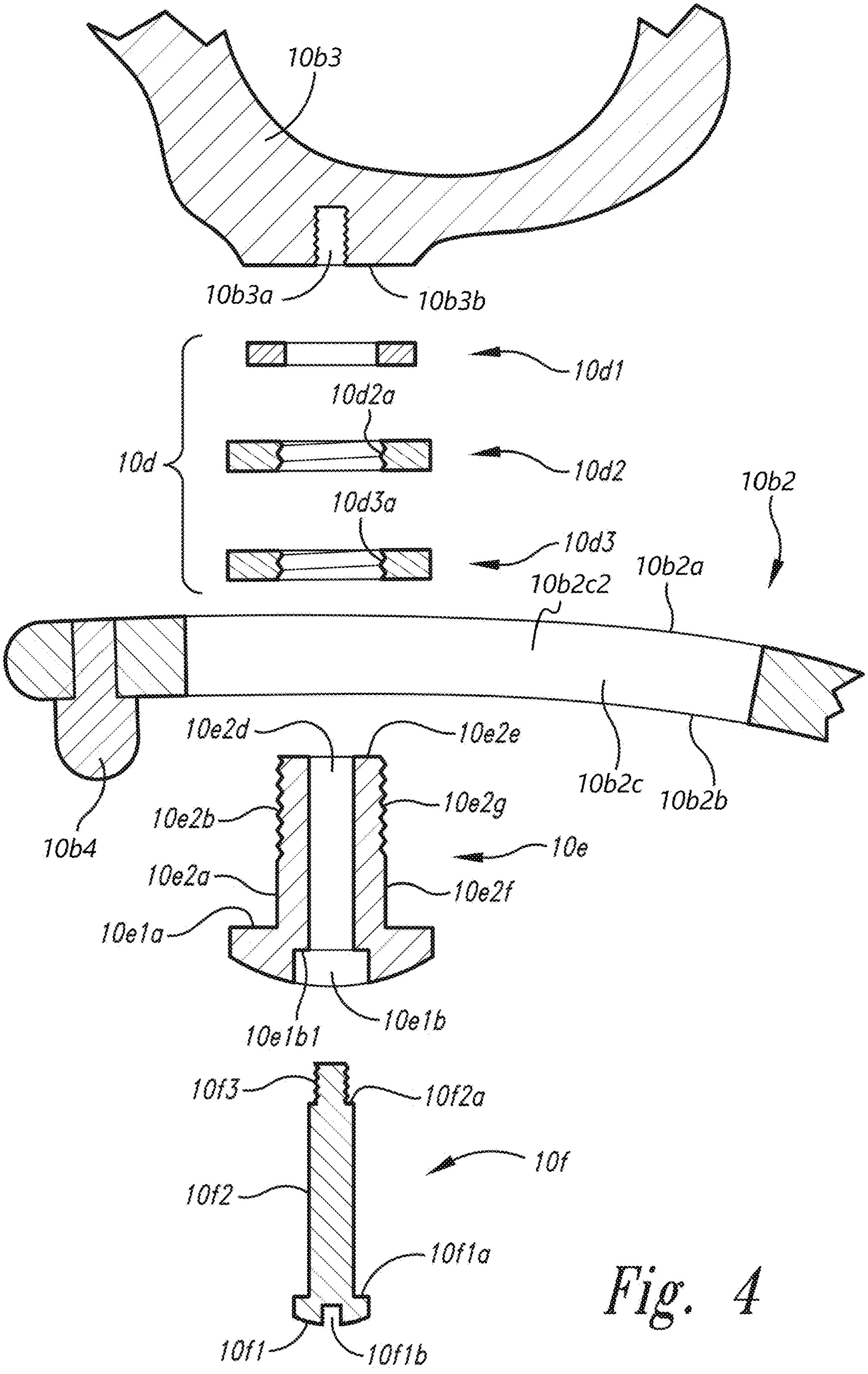
FIG. 4 is an enlarged cross-sectional exploded side-elevational view of a portion of the scissors assembly of FIG. 1.

Turning to FIG. 4, depicted therein is an enlarged cross-sectional exploded side-elevational view of a portion of scissors assembly 10. Implementations of thumb handle **10*b*2 include elongated aperture 10*b*2*c* with longitudinal side 10*b*2*c*2. Implementations of thumb ring 10*b*3 include threaded aperture 10*b*3*a* and proximate surface portion 10*b*3*b*. Implementations of threaded nut 10*d*2 include threaded surface 10*d*2*a*. Implementations of head portion 10*e*1 include head receiving aperture portion 10*e*1*b* with distal surface portion 10*e*1*b*1. Implementations of threaded nut 10*d*3 include threaded surface 10*d*3*a*. Implementations of stem portion 10*e*2 include curvilinear side portion 10*e*2*f* and threaded side portion 10*e*2*g*. Implementations of shaft member 10*f* include head portion 10*f*1 with proximate side 10*f*1*a*, cylindrical portion 10*f*2 with proximate side 10*f*2*a*, and threaded tip portion 10*f*3**.

Figure 5:
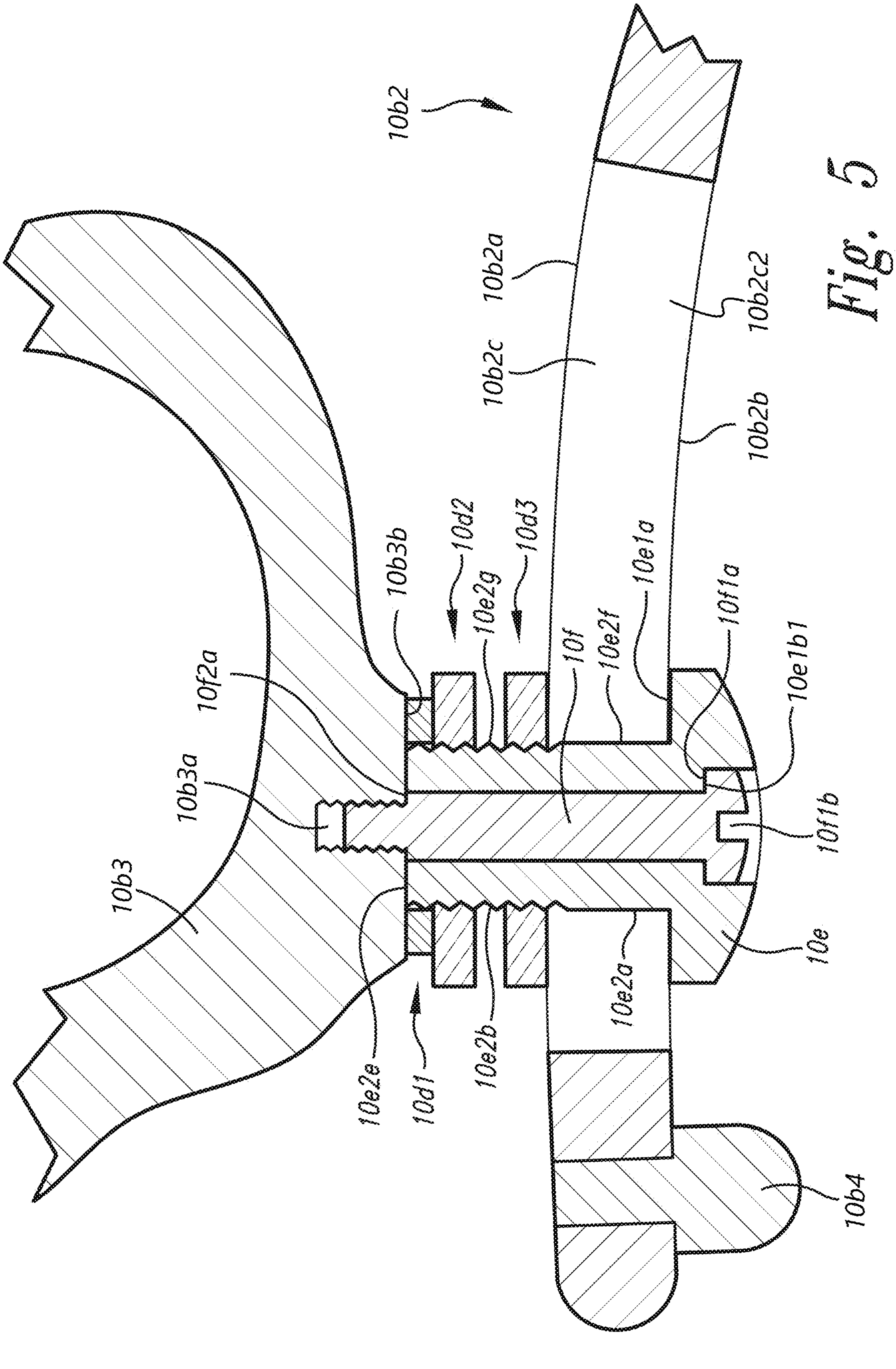
FIG. 5 is an enlarged cross-sectional side-elevational view of the portion of the scissors assembly of FIG. 4 with thumb ring fixedly coupled in a first position along a thumb handle of the scissors assembly.

Turning to FIG. 5, depicted therein is an enlarged cross-sectional side-elevational view of the portion of scissors assembly 10 shown in FIG. 4 with thumb ring **10*b*3 fixedly coupled in a first position along thumb handle 10*b*2. Implementations of head portion 10*f*1 include slotted groove 10*f*1*b***.

Figure 6:
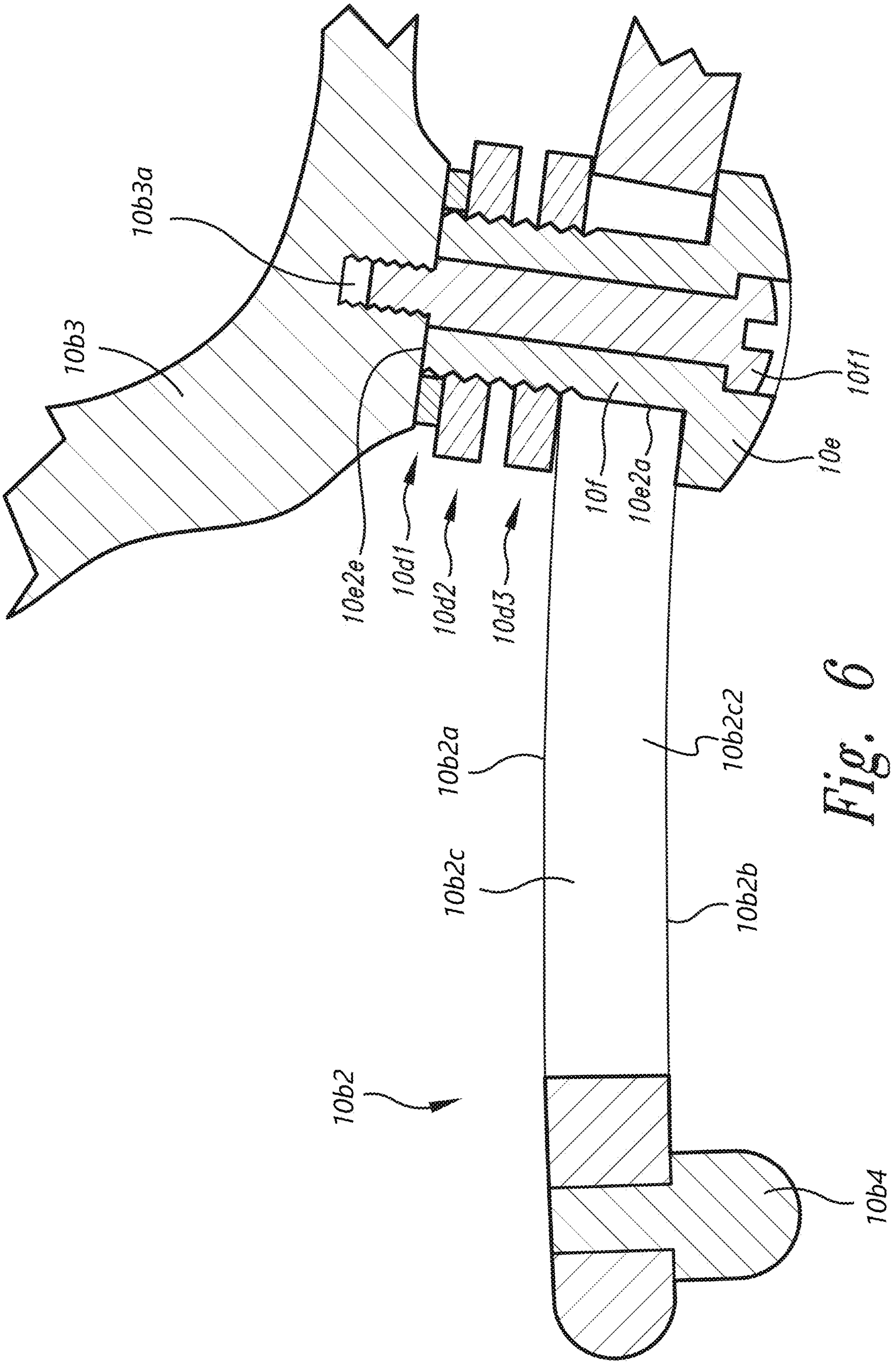
FIG. 6 is an enlarged cross-sectional side-elevational view of the portion of the scissors assembly of FIG. 4 with thumb ring fixedly coupled in a second position along the thumb handle of the scissors assembly.

Turning to FIG. 6, depicted therein is an enlarged cross-sectional side-elevational view of the portion of scissors assembly 10 shown in FIG. 4 with thumb ring **10*b*3 fixedly coupled in a second position along thumb handle 10*b*2**.

Figure 7:
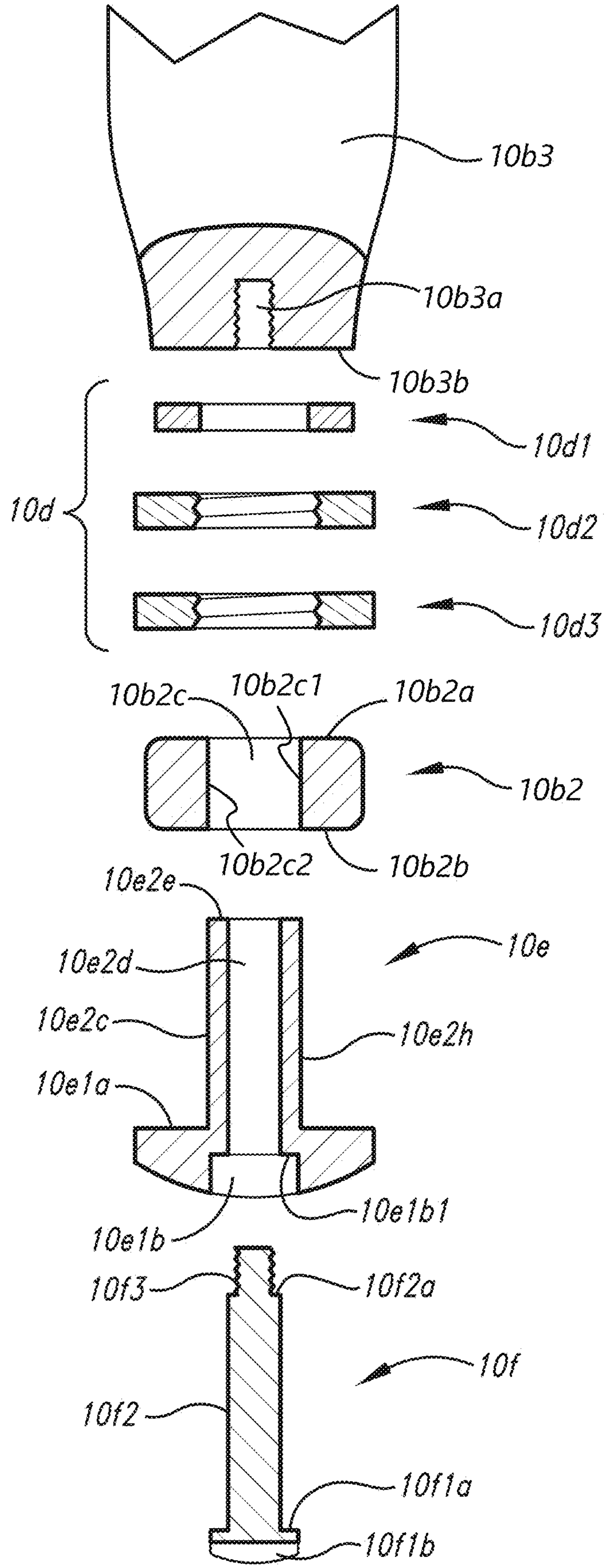
FIG. 7 is an enlarged cross-sectional exploded end-elevational view of a portion of the scissors assembly of FIG. 1.

Turning to FIG. 7, depicted therein is an enlarged cross-sectional exploded end-elevational view of a portion of scissors assembly 10 with stem portion **10*e*2 depicted to include flat side 10*e*2*h*. Further depicted are elongated aperture 10*b*2*c* of thumb handle 10*b*2 with longitudinal side 10*b*2*c*1 and longitudinal side 10*b*2*c*2; and stem portion 10*e*2 of support member 10*e* with flat side 10*e*2*c* and flat side 10*e*2*h*. As indicated by the exploded relationship in FIG. 7, when coupled, flat side 10*e*2*c* is oriented to contact longitudinal side 10*b*2*c*2 and flat side 10*e*2*h* is oriented to contact longitudinal side 10*b*2*c*1**.

Figure 8:
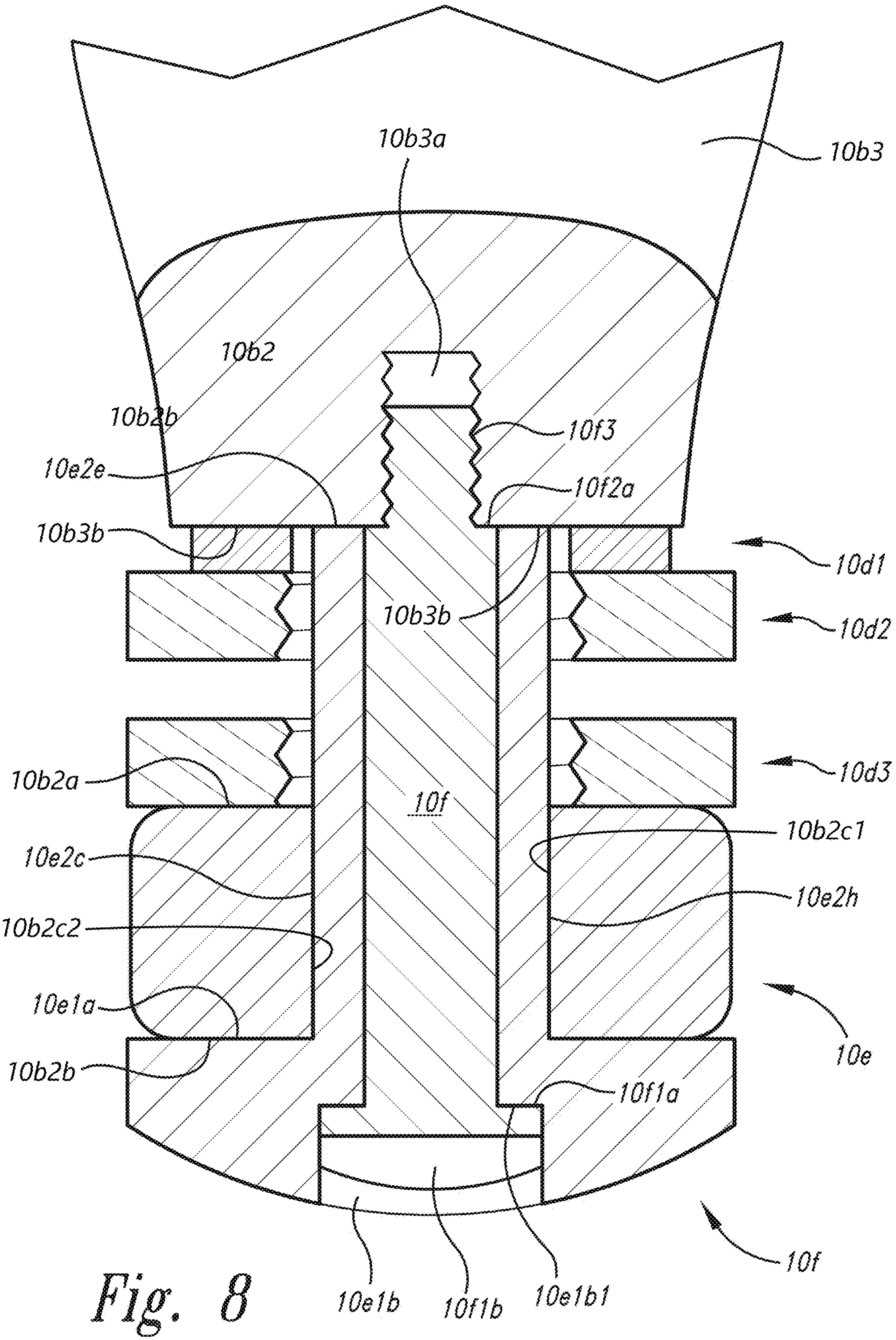
FIG. 8 is an enlarged cross-sectional end-elevational view of the portion of the scissors assembly of FIG. 7 with thumb ring fixedly coupled to the thumb handle of the scissors assembly.

Turning to FIG. 8, depicted therein is an enlarged cross-sectional end-elevational view of the portion of scissors assembly 10 shown in FIG. 7 with thumb ring **10*b*3 fixedly coupled to thumb handle 10*b*2. In the fixedly coupled state, flat side 10*e*2*c* contacts longitudinal side 10*b*2*c*2 and flat side 10*e*2*h* contacts longitudinal side 10*b*2*c*1 of elongated aperture 10*b*2*c*. As used herein for sliding guidance, adjacent means within a tolerance that prevents rotational play while permitting linear displacement along elongated aperture 10*b*2*c***.

Figure 9:
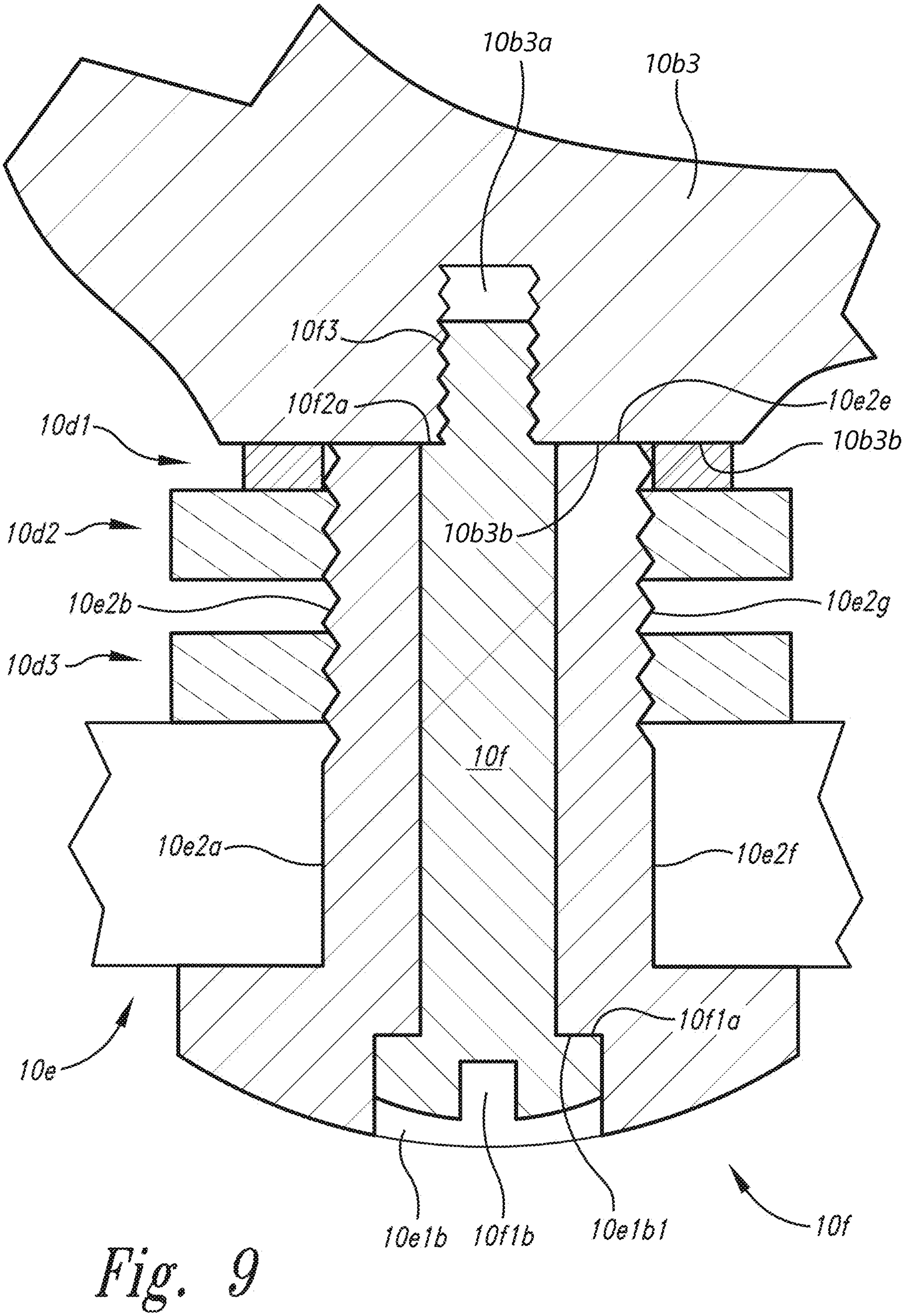
FIG. 9 is an enlarged cross-sectional side-elevational view of the portion of the scissors assembly of FIG. 7 with thumb ring fixedly coupled to the thumb handle of the scissors assembly.
Figure 10:
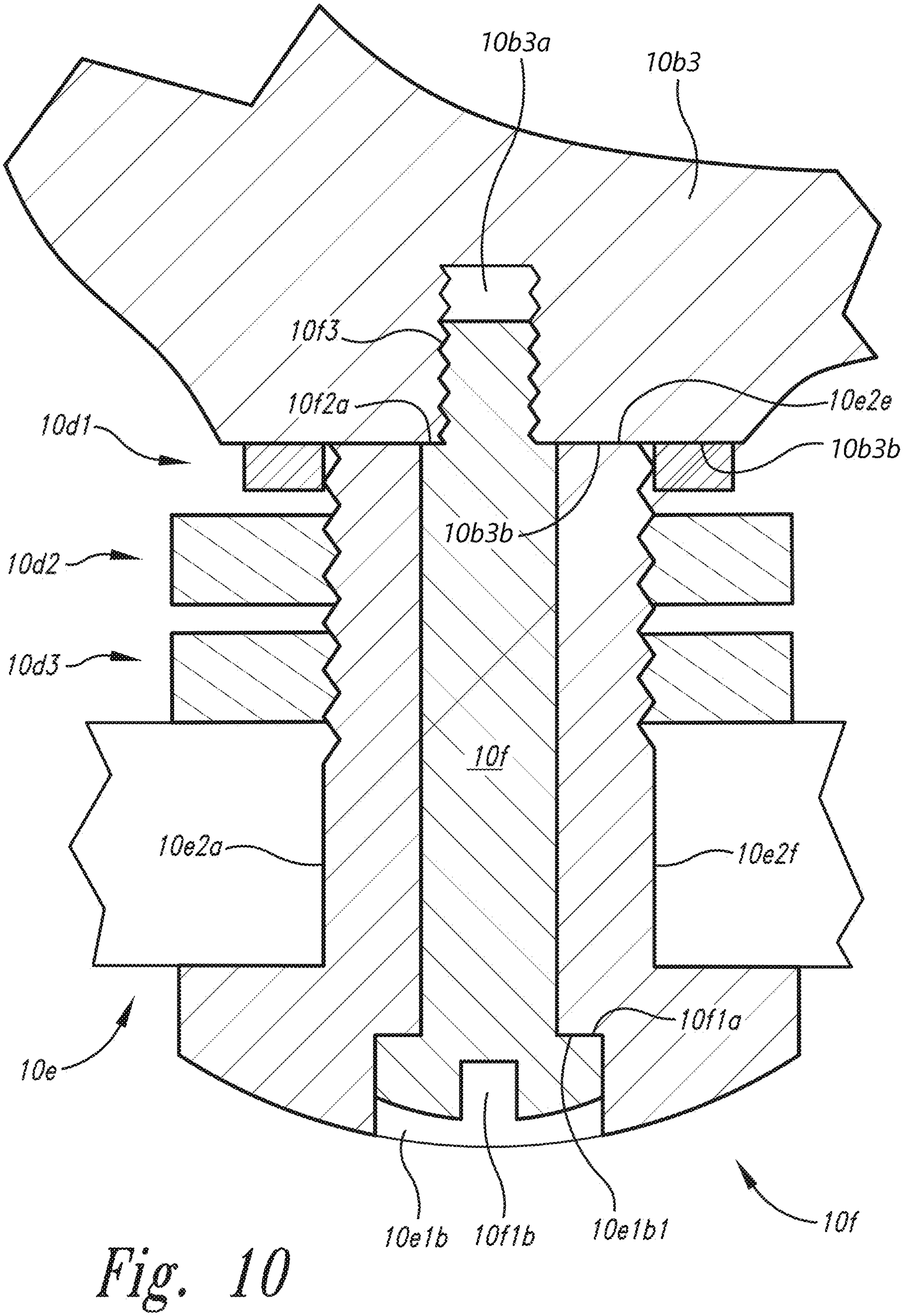
FIG. 10 is an enlarged cross-sectional side-elevational view of the portion of the scissors assembly of FIG. 7 with thumb ring rotatably coupled to the thumb handle of the scissors assembly.

Turning to FIG. 9, depicted therein is an enlarged cross-sectional side-elevational view of the portion of scissors assembly 10 shown in FIG. 7 with thumb ring **10*b*3 fixedly coupled to thumb handle 10*b*2. For clarity, a first coupling condition can correspond to the fixedly coupled condition (FIG. 9), a second coupling condition can correspond to the rotatably coupled condition (FIG. 11), and a third coupling condition can correspond to the slidably coupled condition (FIG. 10). As used herein, a first threaded nut corresponds to threaded nut 10*d*3 on the handle side proximate thumb handle 10*b*2, and a second threaded nut corresponds to threaded nut 10*d*2 on the ring side proximate thumb ring 10*b*3. In the fixedly coupled condition, thumb ring 10*b*3 is coupled with thumb handle 10*b*2 by support member 10*e* received within elongated aperture 10*b*2*c* of thumb handle 10*b*2, shaft member 10*f* coupled with thumb ring 10*b*3, threaded nuts 10*d*2 and 10*d*3, and compressible washer 10*d*1 positioned to load thumb ring 10*b*3. Threaded nut 10*d*3 bears against proximate side 10*b*2*a* of thumb handle 10*b*2, and threaded nut 10*d*2, through compressible washer 10*d*1, bears against proximate surface portion 10*b*3*b* of thumb ring 10*b*3, producing opposed compression that prevents rotation and sliding of thumb ring 10*b*3 relative to thumb handle 10*b*2. Threaded nuts 10*d*2 and 10*d*3 are positioned between thumb handle 10*b*2 and thumb ring 10*b*3 on support member 10*e***.

Turning to FIG. 10, depicted therein is an enlarged cross-sectional side-elevational view of scissors assembly 10 shown in FIG. 7 with thumb ring **10*b*3 slidably coupled to thumb handle 10*b*2. In the slidably coupled condition, support member 10*e* is received within elongated aperture 10*b*2*c*, shaft member 10*f* is coupled with thumb ring 10*b*3, threaded nuts 10*d*2 and 10*d*3 are disposed on support member 10*e*, and compressible washer 10*d*1 is positioned against proximate surface portion 10*b*3*b* of thumb ring 10*b*3. Threaded nut 10*d*3 is spaced from proximate side 10*b*2*a* of thumb handle 10*b*2 so that it imparts no force to thumb handle 10*b*2, while threaded nut 10*d*2 maintains preload through compressible washer 10*d*1 with clearance. Flat side 10*e*2*c* is adjacent longitudinal side 10*b*2*c*2, and flat side 10*e*2*h* is adjacent longitudinal side 10*b*2*c*1, thereby constraining rotation and permitting linear sliding of thumb ring 10*b*3 along elongated aperture 10*b*2*c* relative to thumb handle 10*b*2**.

Figure 11:
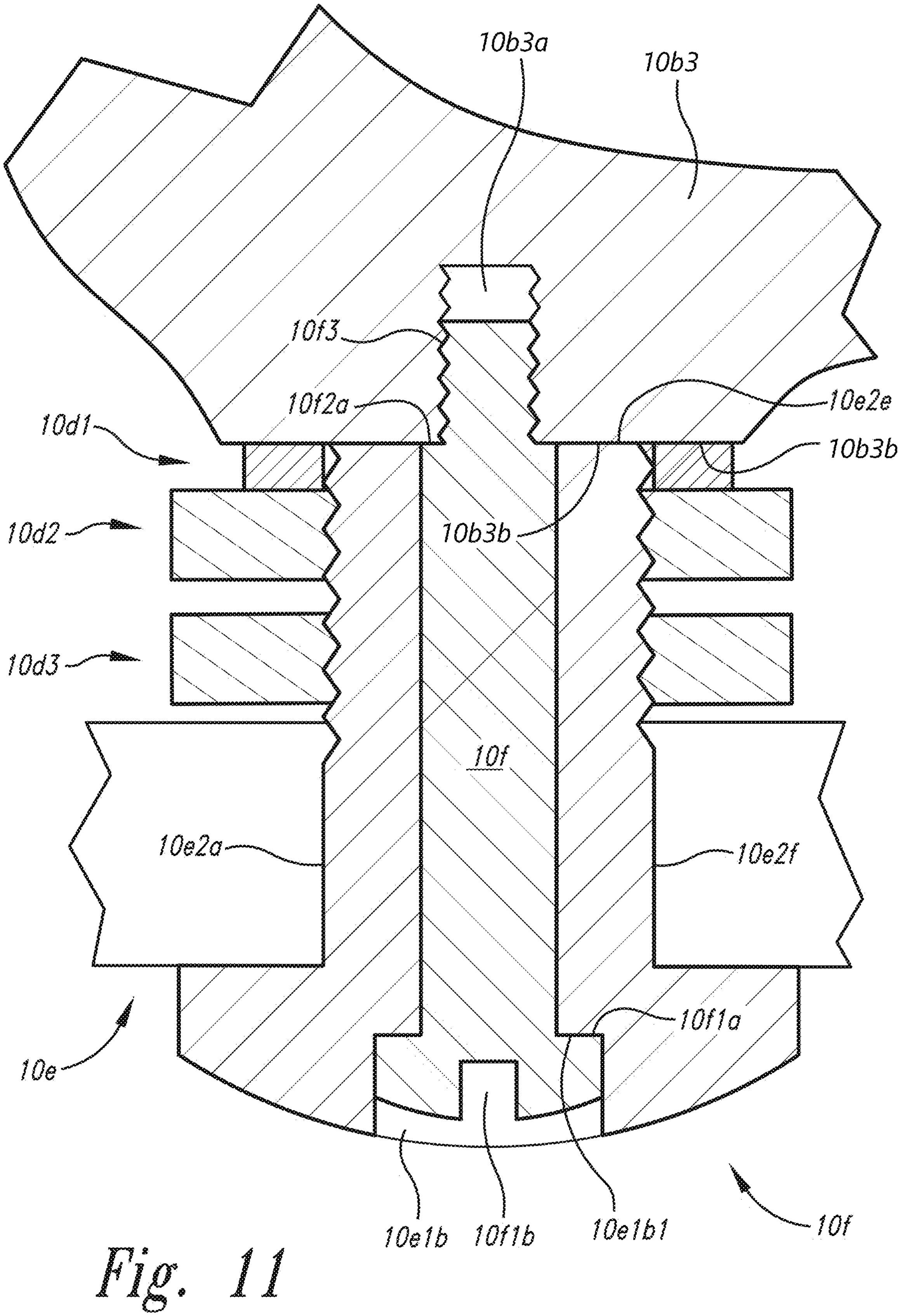
FIG. 11 is a top plan view of a portion of the scissors assembly of FIG. 1 with the thumb ring in a first rotational position.

Turning to FIG. 11, depicted therein is an enlarged cross-sectional side-elevational view of the portion of scissors assembly 10 shown in FIG. 7 with thumb ring **10*b*3 rotatably coupled to thumb handle 10*b*2. In the rotatably coupled condition, support member 10*e* is received within elongated aperture 10*b*2*c* of thumb handle 10*b*2, shaft member 10*f* is coupled with thumb ring 10*b*3, threaded nuts 10*d*2 and 10*d*3 are disposed on support member 10*e*, and compressible washer 10*d*1 is positioned against proximate surface portion 10*b*3*b* of thumb ring. Threaded nut 10*d*2 is spaced from compressible washer 10*dl* and from thumb ring 10*b*3 so as to impart no force to thumb ring 10*b*3, and threaded nut 10*d*3 is spaced from proximate side 10*b*2*a* of thumb handle 10*b*2, thereby providing axial retention without compressive preload on thumb handle 10*b*2 or thumb ring 10*b*3. Cylindrical portion 10*f*2 of shaft member 10*f* is journalled with respect to thumb ring 10*b*3 so that rotation is permitted, while support member 10*e* received within elongated aperture 10*b*2*c*, together with axial retention by threaded nuts 10*d*2 and 10*d*3, prevents sliding of thumb ring 10*b*3 relative to thumb handle 10*b*2**.

Figure 12:
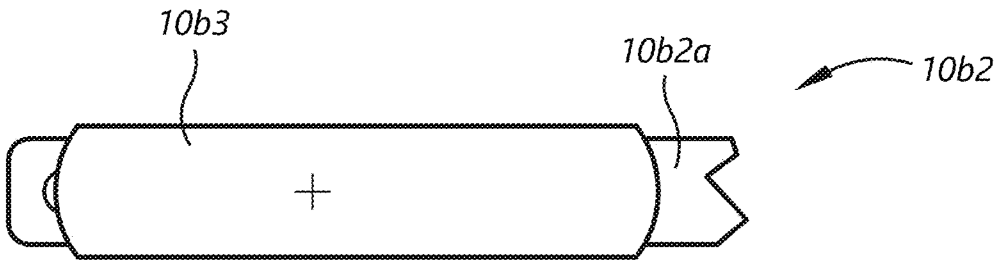
FIG. 12 is a top plan view of the portion of the scissors assembly of FIG. 11 with the thumb ring in a second rotational position.

Turning to FIG. 12, depicted therein is a top plan view of a portion of scissors assembly 10 with thumb ring **10*b*3** in a first rotational position.

Figure 13:
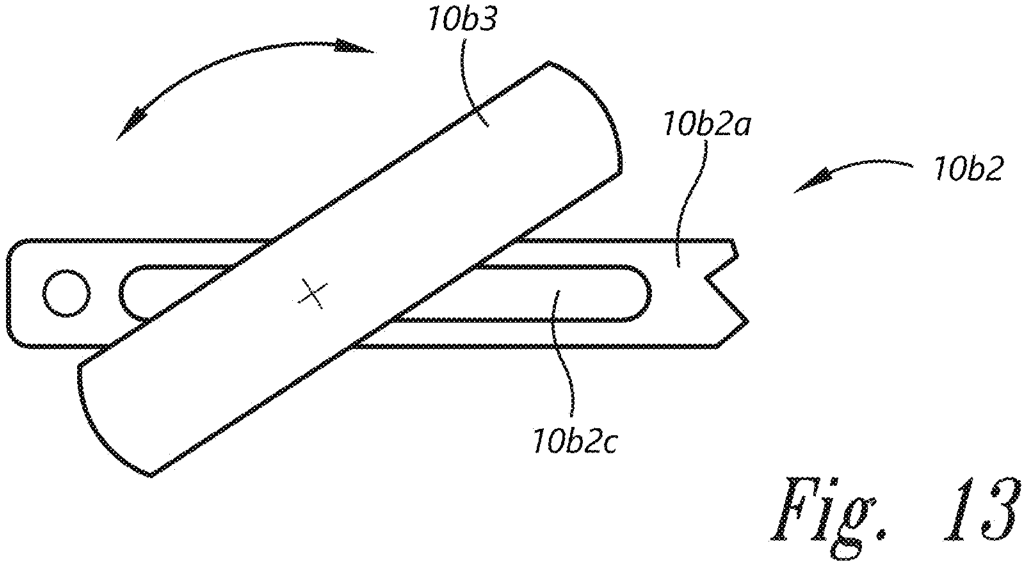
FIG. 13 is a top plan view of the portion of the scissors assembly of FIG. 11 with the thumb ring in a third rotational position.

Turning to FIG. 13, depicted therein is a top plan view of the portion of scissors assembly 10 shown in FIG. 11 with thumb ring **10*b*3** in a second rotational position.

Figure 14:
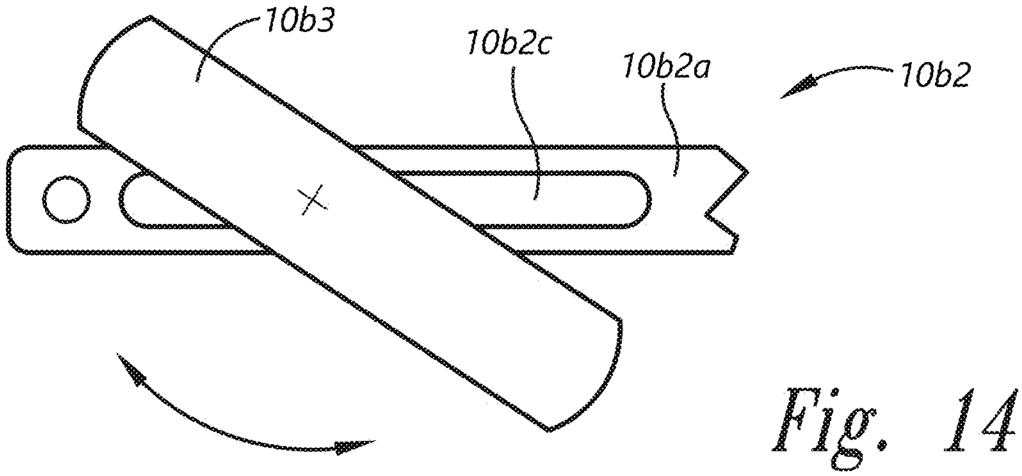
Turning to FIG. 14, depicted therein is a top plan view of the portion of the scissors assembly of FIG. 11 with the thumb ring in the third rotational position.

Turning to FIG. 14, depicted therein is a top plan view of the portion of scissors assembly 10 shown in FIG. 11 with thumb ring **10*b*3** in a third rotational position.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to." etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A scissors assembly comprising:

(I) a thumb handle; and (II) a thumb ring coupled with the thumb handle via a coupling that is selectively configurable in a first coupling condition and a second coupling condition, wherein when the coupling is in the first coupling condition, the thumb ring is fixedly coupled with the thumb handle, so that rotation and sliding of the thumb ring relative to the thumb handle are prevented, and wherein when the coupling is in the second coupling condition, the thumb ring is rotatably coupled with the thumb handle so that rotation is permitted and sliding of the thumb ring relative to the thumb handle is prevented.

2. The scissors assembly of claim 1, wherein the coupling is selectively configurable to a third coupling condition, and wherein, when the coupling is in the third coupling condition, the thumb ring is slidably coupled with the thumb handle so that sliding along an elongated aperture of the thumb handle is permitted and rotation of the thumb ring relative to the thumb handle is constrained.

3. The scissors assembly of claim 2, further including wherein the coupling further includes a plurality of threaded nuts, wherein positioning of the plurality of threaded nuts between the thumb ring and the thumb handle determines one or more of the coupling conditions of the coupling.

4. The scissors assembly of claim 2, further including wherein the coupling further includes a first threaded nut, wherein the thumb handle includes a proximate side and a distal side, wherein the proximate side of the thumb handle is distanced closer to the thumb ring than the distal side is distanced to the thumb ring, and wherein, in the first coupling condition, when the thumb ring is fixedly coupled with the thumb handle, the first threaded nut is positioned to impart force against the proximate side of the thumb handle.

5. The scissors assembly of claim 4, wherein, in the first coupling condition, the thumb ring is fixedly coupled with the thumb handle, the first threaded nut is positioned to directly contact the proximate side of the thumb handle to impart force against the proximate side of the thumb handle.

6. The scissors assembly of claim 4, wherein, in the third coupling condition, the thumb ring is slidably coupled with the thumb handle, the first threaded nut is spaced from the proximate side of the thumb handle so as to impart no force to the thumb handle.

7. The scissors assembly of claim 4, further including wherein the coupling further includes a second threaded nut, wherein the thumb ring includes a proximate side, and wherein, in the first coupling condition, when the thumb ring is fixedly coupled with the thumb handle, the second threaded nut is positioned to apply force through at least one compressible washer of the coupling against the proximate side of the thumb ring.

8. The scissors assembly of claim 7, wherein the at least one compressible washer of the coupling is positioned between the second threaded nut of the coupling and the proximate side of the thumb ring and is contacted by the second threaded nut of the coupling.

9. The scissors assembly of claim 8, wherein, in the first coupling condition, the thumb ring is fixedly coupled with the thumb handle, the second threaded nut is positioned to contact the at least one compressible washer to apply force through the at least one compressible washer against the proximate side of the thumb ring.

10. The scissors assembly of claim 7, wherein the coupling further includes a shaft member, wherein the shaft member includes a cylindrical portion, and wherein the shaft member is fixedly coupled with the thumb ring, and wherein the shaft member forms part of the coupling that is selectively configurable between a first coupling condition, a second coupling condition, and a third coupling condition.

11. The scissors assembly of claim 10, wherein the coupling further includes a support member, wherein the support member includes a cylindrical aperture, wherein the support member is received within the elongated aperture of the thumb handle, wherein the first threaded nut and the second threaded nut are disposed on the support member to be positioned between the thumb handle and the thumb ring, and wherein the cylindrical portion of the shaft member extends at least partially through the cylindrical aperture of the support member.

12. The scissors assembly of claim 11, wherein the thumb handle includes the proximate side and the distal side, wherein the thumb handle includes the elongated aperture that opens through the proximate side of the thumb handle and that has first and second ends and with first and second longitudinal sides, wherein the elongated aperture has a length dimension extending between the first and second ends and a width dimension extending between the first and second longitudinal sides, with the width dimension smaller than the length dimension, and wherein the support member extends at least partially through the elongated aperture of the thumb handle.

13. The scissors assembly of claim 12, wherein the support member includes a first flat side portion and a second flat side portion, wherein at least a portion of the first flat side portion is disposed alongside the first longitudinal side of the elongated aperture and at least a portion of the second flat side portion is disposed alongside the second longitudinal side of the elongated aperture, and wherein the first and second flat side portions are positioned with the first and second longitudinal sides with a clearance fit that constrains rotation of the support member relative to the thumb handle while permitting linear sliding along the length dimension of the elongated aperture.

14. The scissors assembly of claim 12, wherein the support member includes a first threaded side portion on a handle side and a second threaded side portion on a ring side, wherein the first threaded nut is threadedly coupled with the first threaded, side portion, and wherein the second threaded nut is threadedly coupled with the second threaded side portion.

15. A scissors assembly comprising:

(I) a thumb handle;

(II) a thumb ring; and (III) a support member received within an elongated aperture of the thumb handle;

(IV) a shaft member coupled with the thumb ring; and (V) one or more threaded nuts disposed on the support member to be positioned between the thumb handle and the thumb ring, wherein the shaft member engages the support member, wherein positioning of the one or more threaded nuts on the support member determines a coupling condition of the thumb ring with the thumb handle, wherein, in a first coupling condition in which the thumb ring is fixedly coupled with the thumb handle, at least one of the one or more threaded nuts bears against the thumb handle and at least one of the one or more threaded nuts bears against the thumb ring to provide compressive preload and rotation and sliding of the thumb ring relative to the thumb handle are prevented, and wherein, in a second coupling condition in which the thumb ring is rotatably coupled with the thumb handle, at least one of the one or more threaded nuts is spaced from the thumb handle and is spaced from the thumb ring so as to provide axial retention without compressive preload on the thumb handle or the thumb ring rotation is permitted and sliding of the thumb ring relative to the thumb handle is prevented.

16. The scissors assembly of claim 15, wherein in a third coupling condition in which the thumb ring is slidably coupled with the thumb handle, at least one of the one or more threaded nuts is spaced from the thumb handle so as to impart no force to the thumb handle and at least one of the one or more threaded nuts applies preload through at least one compressible washer against the thumb ring, sliding of the thumb ring relative to the thumb handle along the elongated aperture via the support member is permitted and rotation of the thumb ring relative to the thumb handle is constrained.

17. The scissors assembly of claim 15, wherein the support member includes a cylindrical aperture and the shaft member extends through the cylindrical aperture and is coupled to the thumb ring, and wherein the support member includes at least one threaded side portion, and the one or more threaded nuts are threadedly coupled with the at least one threaded side portion of the support member.

18. A scissors assembly comprising:

(I) a thumb handle;

(II) a support member received within an elongated aperture of the thumb handle;

(III) a thumb ring coupled with the support member;

(IV) a first threaded nut disposed on the support member to be positioned between the thumb handle and the thumb ring;

(V) a second threaded nut disposed on the support member to be positioned between the thumb handle and the thumb ring;

(VI) at least one compressible washer positioned between the second threaded nut and the thumb ring; and (VII) a shaft member coupled with the thumb ring and engaging the support member, wherein, when the thumb ring is slidably coupled with the thumb handle, the first threaded nut is positioned to impart no force onto the thumb handle and the second threaded nut maintains preload through the at least one compressible washer with clearance, whereby sliding along the elongated aperture is permitted and rotation of the thumb ring relative to the thumb handle is constrained, wherein, when the thumb ring is fixedly coupled with the thumb handle, the first threaded nut is positioned to contact the thumb handle to impart force to the thumb handle and the second threaded nut is positioned to contact the at least one compressible washer to impart force through the at least one compressible washer to the thumb ring, whereby rotation and sliding of the thumb ring relative to the thumb handle are prevented, and wherein, when the thumb ring is rotatably coupled with the thumb handle, the first threaded nut is positioned to be spaced from the thumb handle so as to impart no force to the thumb handle and the second threaded nut is positioned to be spaced from the at least one compressible washer and from the thumb ring so as to impart no force to the thumb ring, whereby rotation is permitted and sliding of the thumb ring relative to the thumb handle is prevented.

19. The scissors assembly of claim 18, wherein, when the thumb ring is fixedly coupled with the thumb handle, the first threaded nut is positioned to contact the thumb handle to impart force to the thumb handle, and the second threaded nut is positioned to contact at least one compressible washer to impart force through the at least one compressible washer to the thumb ring, whereby rotation and sliding of the thumb ring relative to the thumb handle are prevented.

20. The scissors assembly of claim 18, wherein the thumb handle includes an elongated aperture opening through a proximate side of the thumb handle and having first and second ends and first and second longitudinal sides, wherein the elongated aperture has a length dimension extending between the first and second ends and a width dimension extending between the first and second longitudinal sides, with the width dimension smaller than the length dimension, and wherein the support member is received within and extends at least partially through the elongated aperture of the thumb handle and wherein the support member includes first and second flat side portions disposed alongside the first and second longitudinal sides with a clearance fit that constrains rotation of the support member relative to the thumb handle and, when the thumb ring is slidably coupled with the thumb handle, permits linear sliding of the thumb ring relative to the thumb handle along the length dimension of the elongated aperture.

* * * * *